United States Patent [19]

Olmstead

[11] 4,217,636

[45] Aug. 12, 1980

[54] COMPUTER PERFORMANCE MEASUREMENT DEVICE AND PROCESS

[75] Inventor: Edward A. Olmstead, Federal Way, Wash.

[73] Assignee: Black Bocs, Ltd., Federal Way, Wash.

[21] Appl. No.: 868,033

[22] Filed: Jan. 9, 1978

Related U.S. Application Data

[63] Continuation-in-part of Ser. No. 662,013, Feb. 27, 1976, Pat. No. 4,068,302.

[51] Int. Cl.² .................. G06F 11/00; G01R 19/00
[52] U.S. Cl. ............................... 364/200; 364/551
[58] Field of Search ... 364/200 MS File, 900 MS File, 364/200, 483, 550, 551, 900; 360/31; 361/94; 324/102, 117 H

[56] References Cited

U.S. PATENT DOCUMENTS

| | | | |
|---|---|---|---|
| 3,506,814 | 4/1970 | MacDonald et al. | 360/31 X |
| 3,818,458 | 6/1974 | Deese | 364/200 |
| 3,986,115 | 10/1976 | Huang | 324/102 |
| 3,986,116 | 10/1976 | Smith et al. | 324/102 |
| 4,034,353 | 7/1977 | Denny et al. | 364/200 |
| 4,068,302 | 1/1978 | Olmstead | 364/200 |

Primary Examiner—Raulfe B. Zache

[57] ABSTRACT

A device and process for determining the performance of a computer by determining the performance of its disc information storage system. The read-write heads of the storage system are moved by a coil and armature. There is current in the coil only during head travel. The device senses, externally of the electrical circuits within the computer and information storage system, the presence and direction of current within the coil. From this information the device may determine the amount of time and the percentage of total time the head is moving, the number of head movements, the average time or length of a head movement, and the relative time or length of individual head movements. These are negative indications of the time that no information transfer is occurring in the information storage system, and, therefor, of the efficiency of information placement on the discs in the storage units. The invention also includes the processes of doing these procedures.

27 Claims, 7 Drawing Figures

COMPUTER PERFORMANCE MEASUREMENT DEVICE AND PROCESS

RELATED APPLICATION

This is a continuation-in-part of my copending patent application Ser. No. 662,013, filed Feb. 27, 1976, entitled "Computer Performance Measurement," now U.S. Pat. No. 4,068,302.

BACKGROUND OF THE INVENTION

1. Field of the Invention

Measuring the activity in and the efficiency of the disc information storage units of a computer.

2. Description of the Prior Art

The performance of a computer is important because of its high fixed cost, its high operational cost and its potential for processing information at high speed. Poor performance, in terms of utilization, will not only result in higher operational costs through less work per unit time but also in higher fixed cost through additional equipment needed to handle the work.

Since the theoretical maximum processing capacity of a computer is difficult to determine because of the number of factors affecting it, an assumed maximum capacity is used as an indicator to determine performance. However, even on this basis, determining performance is not easy.

One way is to determine the amount of time, and therefor the percentage of time, that various electrical circuits within the computer are operating. This is done by two principal methods.

The first is to connect wires to specific probe points within these circuits. The wires are connected to external recording devices which will then show when current, and therefor information, is passing through the circuit. This is usually done by measuring the voltage drop in the circuit.

For example, an electrical circuit that would be monitored is the circuit between information storage and either the computer processing section or an external source. The greater percentage of time that information is passing through the circuit, as indicated by the current within the circuit, the better the performance of the computer.

In most large computers this information, both processable information and processing or program information, is stored on discs in an array of cylinders. The cylinders are best represented by concentric rings on the surfaces of the discs. There may be as many as five hundred cylinders of information on a disc and five thousand or more bits of information on each cylinder. Usually, a number of discs, from two to twenty, are mounted together as a unit and rotate on a single axis. There may be as many as one thousand of these units in a computing facility. Three to four hundred units are common.

For each side of a disc there is a corresponding read-write head. The head reads or carries information stored on a cylinder to the computer information processing section or to an external source, and writes or carries information either from an external source or the computer information processing section to a cylinder for storage.

Each head is mounted on an arm. The arms for a unit of discs are integral and form a comb. The comb moves all the heads together radially back and forth among the cylinders on the discs. Only information to or from a single cylinder on one side of a disc in a unit of discs may be transferred, or accessed, at any one time.

One method of determining the performance of the disc storage, and the computer, is to attach wires to the electrical circuits of the heads and determine the amount of time that current, on information, is passing through the heads.

There are a number of problems that can occur when wires are attached directly to these circuits, or directly to any electrical circuit within the computer.

The major problem is the information passing through the circuit may be changed when external wires are attached. Extraneous current from the wire may pass into the circuit and be interpreted as information by the computer information processing section or the storage system. If there is no information passing through the circuit, the extraneous current may supply information when there should be none. If there is current, or information, passing through the circuit, the extraneous current may add or subtract from the current in the circuit and change the information passing through the circuit. These changes will result in reduced performance because the information must be reprocessed. Often the computer will stop because the information or program is unprocessable.

It is also difficult to place the wires properly. Several man days are required because of the number of wires. The probe points must be located and tests made to determine whether they have been located correctly.

The possibilities for error are great when testing for performance this way.

A second method is to make a continuous record of the transactions occurring in the system. A software program is introduced into the system. The program requires that any transaction be recorded on a separate tape or disc file. The location of the transaction will also be recorded. The file is later analyzed to determine the performance of the computer. A practical problem is that the analysis occurs long after the transactions that were monitored, and the conditions within the computer and information storage system at the time of analysis may nöt be the same as at the time of monitoring. It is an attempt to improve the performance of a filing system after many of the old files, on which the performance evaluation had been based, have been replaced with new files.

SUMMARY OF THE INVENTION

The inventor indicated in his copending patent application Ser. No. 662,013 now U.S. Pat. No. 4,068,302 that it was possible to replace the positive indication of computer performance described above, with its inherent problems, with a negative indicator of computer performance that would not have these problems. Read-write head movement can be detected externally of the electrical system of the computer and the information storage system by detecting externally of the electrical system current in or to the coil used to move the head. It is then possible to obtain instantaneous information about the performance of the computer without interfering with the internal electrical circuitry of the computer system. It is, in fact, a double protection because the detector circuit has been moved from the computer information carrying circuit to another, and separate, circuit used to activate the coil that moves the head. The detector circuit has also been changed from a direct internal connection to the electrical system of the computer and information storage system to an indirect external sensing of an event within the separate circuit.

The read-write head is moved radially among the cylinders by a coil and armature. No current flows through the coil when the head is at rest. Current flows through the coil in one direction when the head is accelerating and in the opposite direction when the head is decelerating. The initial direction of current flow will depend upon the direction of head movement. The current flow in or to the coil may be used to determine the time the head is moving, and not transmitting or receiving information. An individual cycle of current in or to the coil would show an individual head movement.

Both of these events, current flow and current cycle, may be detected externally of the computer electrical circuit and this data used to determine the amount of time and the percentage of total time the head is moving, the number of head movements, the average time or length of a head movement, and the relative time or length of an individual head movement. All, or appropriate parts, of this resulting data would be recorded to provide a ready display to the operator who would use this resulting data to balance or better locate information within or being transferred to the information storage units.

The present device and process would allow the operator to take corrective action close to the time of the activity being monitored. The operator would also be able to take this corrective action continually rather than occasionally after an elaborate check of the system. This would allow more efficient performance on a continuing basis.

DESCRIPTION OF THE PREFERRED EMBODIMENT

Figure 1:
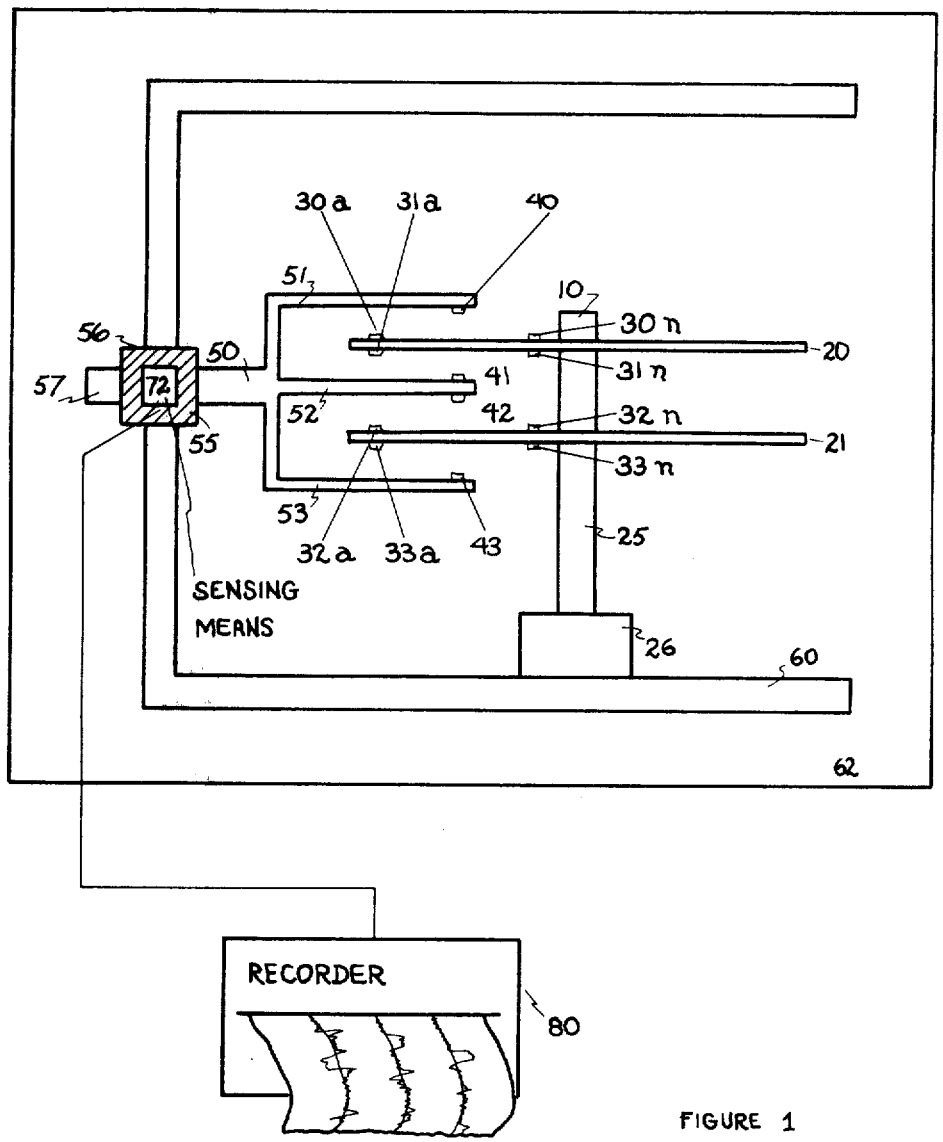
FIG. 1 shows a disc storage device with, in block diagram, a current sensing device and recording apparatus.

FIG. 1 is a schematic diagram of a disc information storage system. For simplicity a unit 10 of two discs is shown. Discs 20 and 21 rotate on an axis 25 driven by a motor 26.

Each disc has cylinders on both its upper and lower face. Cylinders 30a–30n and 31a–31n are on the upper and lower face, respectively, of disc 20, and cylinders 32a–32n and 33a–33n are on the upper and lower face, respectively of disc 21. As stated before, each face may have as many as five hundred cylinders.

There is also a read-write head for each face of a disc. The head accesses the cylinders to transfer information both to and from them. The head 40 is opposite the upper face of disc 20; the head 41 is opposite the lower face of disc 20; the head 42 is opposite the upper face of disc 21; and the head 43 is opposite the lower face of disc 21.

The heads are moved as a unit among the cylinders by integral arms or comb 50 - head 40 on arm 51, heads 41 and 42 on arm 52 and head 43 on arm 53. Comb 50 is moved by means 55. This means is a coil 56 which moves an armature 57 attached to comb 50.

The entire mechanism is mounted on a frame 60 within housing 62. Typically, the motor 26 and coil 56 would be mounted fixedly on frame 60, and the axis 25 would be mounted rotatably on the frame 60.

Figure 2:
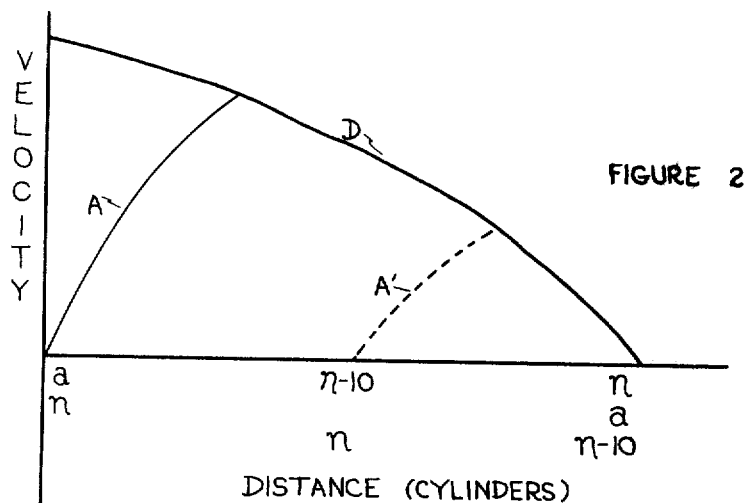
FIG. 2 is a typical acceleration-deceleration curve of a read-write head during travel.

FIG. 2 is a standard acceleration-deceleration curve of a head. The curve shows that the head accelerates rapidly at a maximum rate from a state of rest and then slows gradually to rest at the required cylinder. The slope of the acceleration curve will be the same no matter how many cylinders the head traverses in its travel. Only the time of acceleration will differ.

In FIG. 2, two different traversals are shown. The first, from cylinder a to cylinder n, has an acceleration curve A. The second, from cylinder n-10 to cylinder n, has an acceleration curve A'. The slopes of curves A and A' are the same. Only the length of time required for the acceleration curves to intersect the braking or deceleration curve D differs.

FIG. 2 also shows the deceleration curve D to be the same for any traversal of the head so the slope of the curve is always the same. Again, only the length of time changes.

This Figure also discloses that the more cylinders that must be traversed between information transfers, the more time that will be required for head travel and the less time that will be available for information transfer. If the operator can see that the heads are moving between distantly placed cylinders and making wide traversals, he can place often used information or instructions in adjacent or close cylinders to reduce the time of arm travel and increase the efficiency of the computer storage unit and the computer.

FIG. 2 also illustrates that the acceleration-deceleration curve for a head when moving from cylinder n to cylinder a is the same as the curve from cylinder a to cylinder n; and the acceleration-deceleration curve for a head when moving from cylinder n to cylinder n-10 is the same as the curve from cylinder n-10 to cylinder n.

Figure 3:
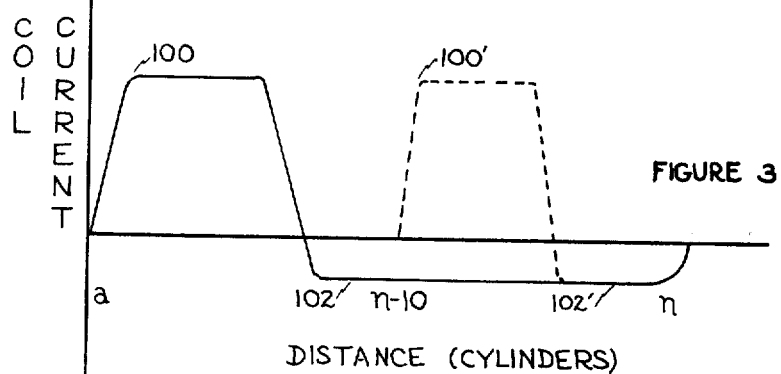
FIGS. 3 and 4 are diagrams showing current flow through the coil during head travel. This same current flow would be in the wires carrying current to the coil.
Figure 4:
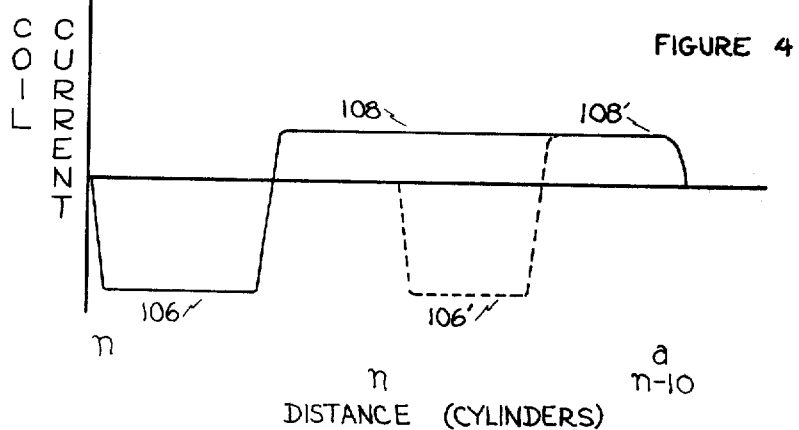

FIGS. 3 and 4 show typical current flow in the coil 56 and the wires carrying current to coil 56 during the head travel shown in FIG. 2. FIG. 3 displays typical current flow when the head travels in one direction and FIG. 4 displays typical current flow when the head travels in the opposite direction. These Figures also show the different character of the current flow for the long and short head traversals in FIG. 2. In either traversal, at the start of head travel the current in coil 56 and the wires carrying current to it will rise rapidly to a maximum level and remain at that level until braking occurs. The direction of current flow through coil 56 during acceleration will depend upon the direction of head travel.

In FIG. 3 the acceleration current through coil 56 and its associated wires—100 for the long traversal a to n and 100' for the short traversal n-10 to n—rises rapidly to a maximum level and remains at that level until braking occurs. The level is the same whatever the length of the traversal.

FIG. 4 illustrates current flow in coil 56 and its associated wiring when head travel is opposite to that shown in FIG. 3. Again, the acceleration current through coil 56 and its associated wiring—106 for the long traversal n to a and 106' for the short traversal n to n-10—rises rapidly to the same maximum level. However, the direction of current flow is in a direction opposite to that shown in FIG. 3.

From this it can be seen that the maximum level of current during acceleration is the same regardless of length or direction of traversal. The only difference is in the direction of current flow which depends on the direction of head travel, and the time of current flow which depends on the length of head travel.

As was stated before, the read-write head, and the comb formed by the arms to which the heads are attached and the armature which moves them form an integral unit. Thus head movement and arm or comb movement are the same.

The acceleration current through coil 56 causes the armature to move within the coil in a direction appropriate to the direction of current flow. A braking force must be applied to stop the forward momentum of the armature. This braking force is provided by changing the direction of current flow through the coil 56.

This deceleration or braking action is shown by the typical deceleration curve D in FIG. 2 and the deceleration or braking force by the typical deceleration current in FIGS. 3 and 4. FIGS. 3 and 4 disclose that the level of the deceleration current is the same for either a long or a short traversal. It is only the length of time of application of the current that changes. These Figures also disclose that the value of the deceleration current is less than that of the acceleration current, and its direction is opposite to that of the acceleration current.

In FIG. 3 the deceleration current through coil 56 and its associated wiring—102 for the long traversal a to n or 102' for the short traversal n-10 to n—has a level which is less than that of the acceleration current 100 or 100', and is in a direction opposite the direction of acceleration current 100 or 100'. The Figure also shows the level is the same for any traversal.

FIG. 4 shows the deceleration current for head travel in the opposite direction—108 for the long traversal n to a and 108' for the short traversal n to n-10. The level of the deceleration current in FIG. 4 is the same as the level in FIG. 3, but its direction is opposite to that of FIG. 3.

At the end of braking the flow of current in coil 56 and its lead wires stops and the level of current returns to zero, completing a current cycle.

This flow of current through coil 56 and its associated wiring can be detected by means 72 in FIG. 1. The means 72 is a current sensing device, such as a current transformer or a Hall Device, adjacent either coil 56, or, preferably, the lead wires providing current to coil 56. The coil 56 and its associated wires or lead wires carrying current to the coil constitute the coil circuit. The means 72 will have generated within it a slight amount of current in response to the current in coil 56 and its associated wiring. The direction of current flow in means 72 will depend upon the direction of current flow in coil 56 and its associated wiring. Means 72 can, therefor, detect both the presence of current in coil 56 and its lead wires, and the direction of current flow in coil 56 and its lead wires. The means 72 then detects both the time current is flowing through coil 56 and its associated wiring, and the number of discrete current cycles occurring in coil 56 and its associated wiring.

The means 72 would be connected to a recorder—a graphic plotter, a counter, a light system, a computer, a minicomputer, or a tape recorder. The recorder would be placed to provide a ready display to those operating the computer facility and allow them to use the displayed data to make appropriate adjustments within the facility for improved performance. It should be understood that certain operations may be handled either by a minicomputer or by the computer itself, and the data could be provided directly to either the minicomputer or the computer. These would be programmed to use the data to both locate new information and relocate stored information to provide better computer performance.

The recorder and its associated processing equipment would both determine the time the head is in movement by counting the time current is flowing through the coil 56 and its associated wiring, and the number of individual head movements by counting the number of current cycles in coil 56 and its associated wiring. From this data the device may determine for a given time interval the amount of time and the percentage of total time the head is moving, the number of head movements, the average time or length of a head movement, and also, on a discrete basis, the relative time or length of individual head movements.

Figure 5:
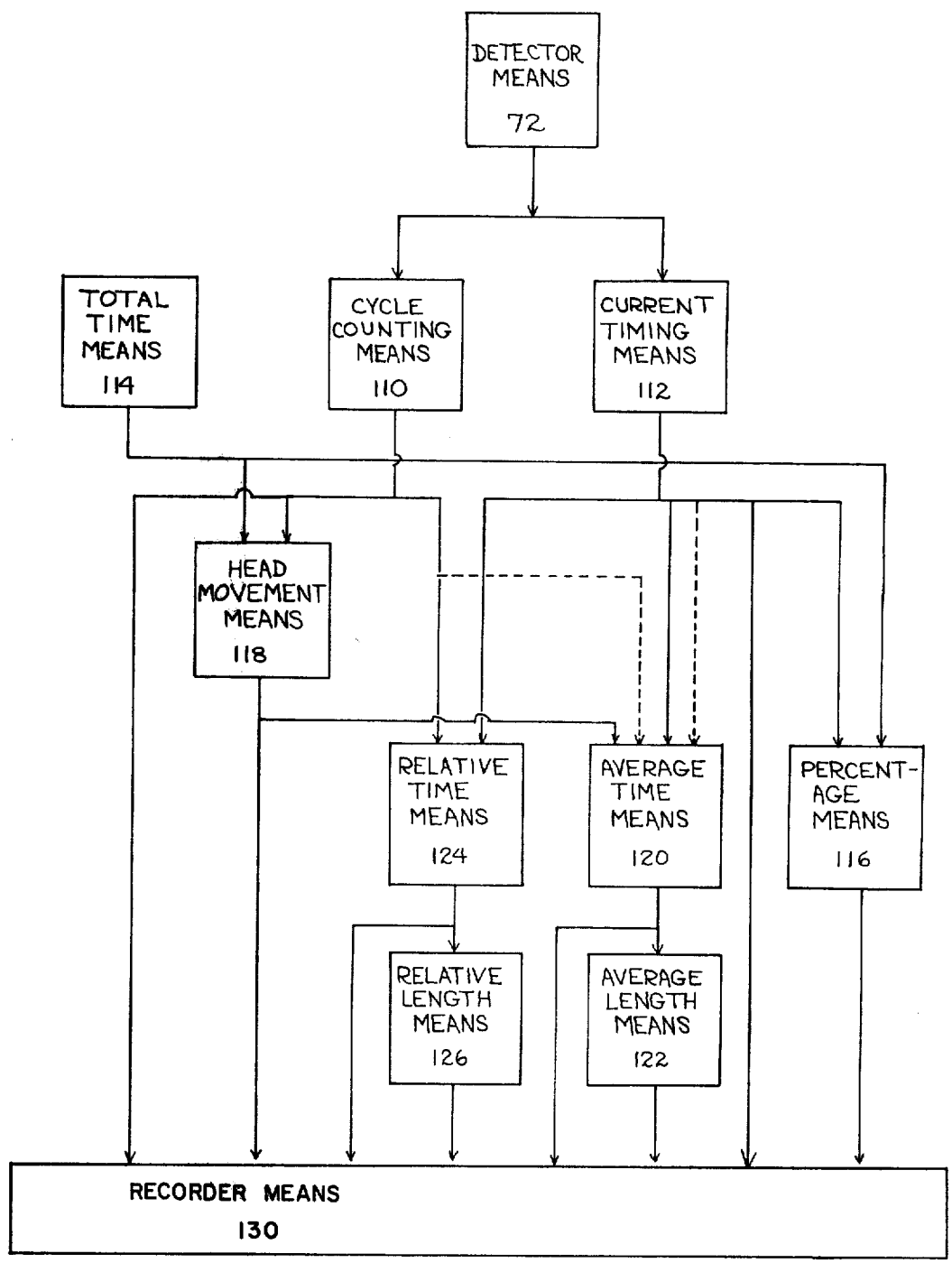
FIG. 5 is a block diagram of the current sensing and recording device.

FIG. 5 is a block diagram of a device for doing this. The means 72 is connected both to a cycle counting means 110 and a current timing means 112. The cycle counting means 110 counts each cycle of acceleration-deceleration current flowing though coil 56 and its associated wiring. The current timing means 112 counts the total time current is flowing through coil 56 and its associated wiring during any given time interval. A total time means 114 is also provided. This means counts the total time that has elapsed during the same given time interval.

Means 116 is connected to both current timing means 112 and total time means 114. Means 116 compares the data received from each of these means and determines and provides the percentage of time during the given time interval the arm has been moving and not been used for information transmission.

Means 118 is connected to both cycle counting means 110 and total time means 114. Means 118 compares the data received from each of these means and determines and provides the number of head movements that have taken place during the time interval.

Means 120 is connected to current timing means 112 and either the head movement means 118 or the cycle counting means 110 and the total time means 114. Means 120 compares the data received about the number of head movements and the total time of current flow during the time interval to determine and provide the average travel time per head movement during the time interval.

The average time of travel per head movement determined and provided by means 120 may be converted to the average length of a head movement or the average number of cylinders traversed during a head movement because there is a direct correlation between the time of head movement, the length of head movement and the number of cylinders traversed by the head during movement. If the operator needs this data either the average length of head movement or the average number of cylinders traversed by the head or both may be provided with or in place of the average time of head movement.

Means 122 does this. It has a data bank comparing travel time with length of travel and number of cylinders traversed. It is connected to means 120 and compares the average travel time received from means 120 with the comparative data in the data bank and provides either the average travel length or the average number of cylinders traversed or both.

Means 124 is connected to cycle counting means 110 and current timing means 112. It compares the data received from these two means to determine and provide the relative time of individual head movements. Since the amount of data that could be provided would be overwhelming, the data provided would usually indicate an exception from a standard. Only exceptionally long travel times would be indicated. A specific travel time would be set and any travel time greater than that time would be indicated, for example, by a single light. It would light if the individual head travel time exceeded the threshold time. The term "light" is used throughout as generic to any type of light source including light emitting diodes.

The output of means 124 may also be converted to the length of head movement or the number of cylinders traversed. This is done by means 126. It has the same data bank as means 122. It may even use the same data bank as means 122, or the same means may be used to perform both functions. It is connected to means 124 and compares the data from means 124 with the data in the comparative data bank and provides the relative travel length or the relative number of cylinders traversed. Again, it is preferred that a single light be used and the display indicate an exception from a given standard.

The operator would also wish to know if there was no arm or head movement in a unit. This fact could be obtained directly from cycle counting means 110, current timing means 112, or relative time means 124 connected to them. A second light could display this fact. It would light if there were no output from any one of these means and remain lit if there continued to be no output.

However, it might be preferable for the operator to know if there had been no head movement during a given time interval. This would require the input from total time means 114. Consequently, means 116, 118, or 120 could also be used because these would indicate that no head movement had taken place during a given time interval. Again, a single light could be used to indicate this fact. It would light if there had been no movement during the previous time interval and remain lit during the next and subsequent time intervals if there continued to be no movement. The light would go dark following a time interval in which there had been a head movement.

From these data the operator may learn the percentage of time it is possible for the disc storage device to transmit or receive data, the number of times the arm and head had to move to access information, the average time and length of head travel, and the relative time and length of individual head movements.

It should be understood that recording means 130 can be connected to current timing means 112, percentage means 116, relative time means 124, cycle counting means 110, average travel time means 120 or head movement means 118 to provide data from these means. The recorder means 130 could have means associated with it for providing given data for a predetermined length of time. For example, this means would maintain the recorder in an activated state for a predetermined length of time once the recorder indicates a relative time greater than the threshold time. The recorder means may be a computer means for receiving the data and locating and relocating information within the computer information storage system in response to the data.

Figure 6:
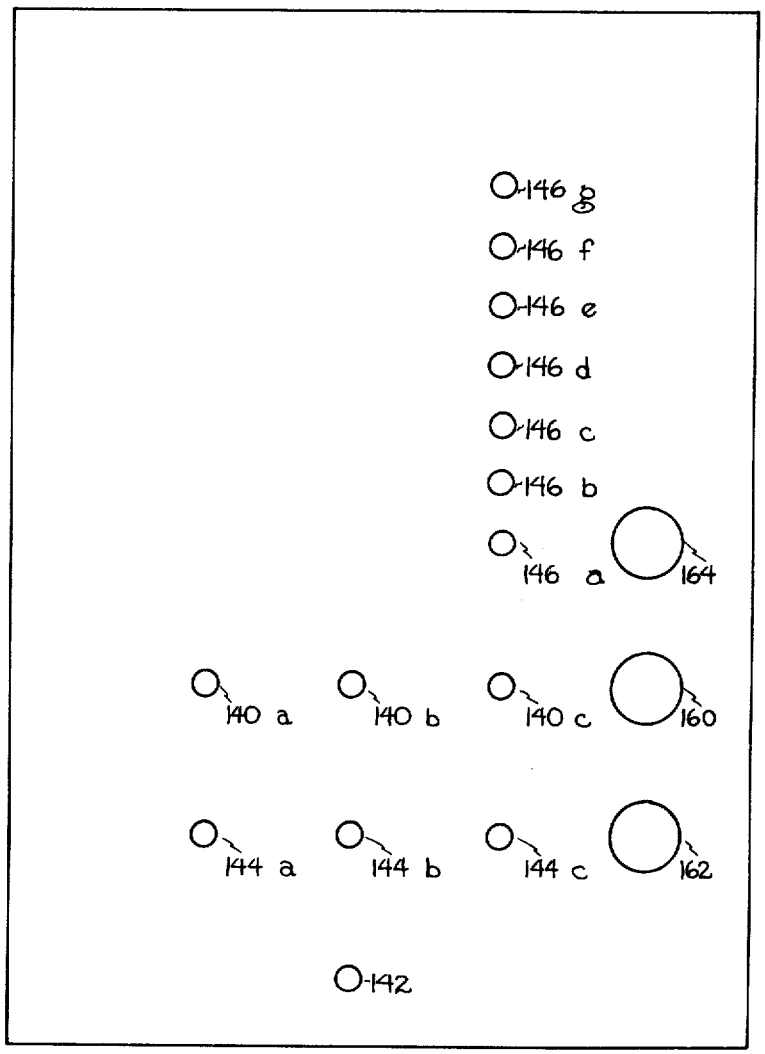
FIG. 6 is a front plan view of a recorder showing a preferred display.

One way this data could be provided would be the visual display on the recorder shown in FIG. 6. The recorder would be located centrally to provide a continuous and timely display of the data from each of the information storage units to those operating the computer facility. A central display which may be seen easily from the computer control panel is necessary in the usual multiple storage unit system of from two hundred to one thousand units.

The operator should be able to see the continuing flow of data from the information storage units, and, based on this data, make adjustments within the information storage units to improve the performance and efficiency of the system. These adjustments would include relocating stored information already on the discs, and properly locating new information being transmitted to the discs. Both of these adjustments could be within a single unit or a disc of a single unit, or among units.

The adjustments could be within a single unit if the display indicates the unit has an average or relative travel time or length that is greater than normal. This would indicate to the operator that information could be placed on the discs in the unit better than it presently is. Relocation of the information on the discs in the unit would cause less head travel time and better use and efficiency of the storage unit.

The adjustments would be among the units if the display indicated that some of the information storage units were overloaded and others were underused or not used at all. Information would then be transferred from the overloaded units to the underused or unused units to create a more uniform and efficient flow of information from and to the units. New information would be placed on underused or unused units.

However, the operator can make these adjustments only if the data is presented in an easily understood form. The amount of data that could be displayed and the speed with which it could be displayed creates a need for a simple display that can be understood quickly by the operator. Certain displays, such as numbers, require too long a time interval if the data is to be understood.

The best display appears to be one using lights. The data would be represented by one or more lights. The exact number of lights in a particular display will depend on the data being transmitted. However, there should be as few lights as possible to allow the data to be easily noted. It is possible that different colors will be used to indicate particular data or exceptions.

Central recorder 80 in FIG. 6 has a display for a single information storage unit. However, several types of displays are illustrated.

The simplest is a single light 140 which indicates an exception to normal operation. It will light if the condition being monitored exceeds a threshold figure—too great a percentage of total time being used for head movements, too many head movements, too great an average time or length of head movement, or too great a relative time or length of head movement. Each of these conditions may be indicated by individual lights, by a single light with a selector switch, or by a combination of these. The combination is considered to be best because it allows flexibility without creating an overpowering amount of data.

One combination is illustrated in FIG. 6. Light 140a indicates whether the relative time or length of an individual head movement has exceeded a threshold level. This light would have a circuit that would maintain it on long enough to be noticed. The exact predetermined time would depend upon the computer configuration and the amount of data being received. Light 140b indicates whether the number of head movements during the time interval have exceeded a threshold level. Light 140c indicates whether either the percentage of total time, or the average time or length of head movement has exceeded a threshold level. These could also be indicated by two separate lights. Light 140c is connected to the selector switch 160 on the recorder 80. The switch could also be on the computer control panel.

The upper threshold means used with these lights usually would be a circuit between the determination means—the percentage means 116, the head movement means 118, the average travel time or length means 120 or 122, or the relative time or length means 124 or 126—and the display means. The upper threshold means would allow only data greater than the threshold to reach the display means.

A second light would indicate that no head movement was occurring in a unit. This could be a continuing display or be based on a time interval. This fact is indicated by light 142.

It is possible that there should be a display indicating activity below a threshold level. This threshold level would be lower than the upper threshold level. In this case light 144 would be used in place of or in conjunction with light 142. It will light if the condition being monitored is below a threshold figure—too small a percentage of total time being used for head movement, too few head movements, too small an average time or length of head movement, or too small a relative time or length of head movement. Again, each of these conditions may be indicated by individual lights, by a single light with a selector switch, or by a combination of these. The combination again is considered to be best.

One combination is shown in FIG. 6. Light 144a indicates whether the relative time or length of an individual head movement is less than a threshold level. This light would also have a circuit that would maintain it lit a predetermined length of time in order to be noticed. Light 144b indicates whether the number of head movements during a time interval are fewer than a threshold number. Light 144c indicates whether either the percentage of total time, or the average time or length of head movement is less than a threshold level. This could also be done by two separate lights. Light 144c is connected to selector switch 162 or the recorder 80. This switch could also be on the computer control panel.

The lower threshold means is similar to the upper threshold means. It would usually be a circuit between the determination means and the display means. However, it would be more complex than the upper threshold means because it can not allow all data below the threshold level to reach the display means. It must differentiate between a total datum that is below the threshold level and a total datum that is above the threshold level. The former would pass through to the display means. The portion of the latter below the threshold level would not pass through to the display means so that the total latter datum would be excluded by the lower threshold means.

The upper set of lights on the recorder 80 is optional. These provide more detailed data than the lower group of lights. For example, lights 146a-g may indicate the maximum percentage of time the head moves during a time interval—146a, two percent; 146b, four percent; 146c, eight percent; 146d, sixteen percent; 146e, thirty-two percent; 146f, sixty-four percent; and 146g, one hundred percent. A set of lights can also be used to give detailed information about the number of head movements or the average time or length of a head movement. Again, it is possible to use individual sets of lights for each condition, a single set of lights with a selector switch, or a combination of these. In FIG. 6 a single set with a selector switch 164 is shown.

An entire set of lights need not be used. The lights can be set to display only exceptions from a normal pattern by using upper or lower thresholds. The lights would display those percentages, head movements, or average times or lengths above the upper threshold level or below the lower threshold level. However, this data could be given in more detail than the earlier single lights.

It should be understood that a light display is only one way of providing data. The recorder might have a counter or create a permanent record. This could be a continuous graph or other type of permanent or semipermanent record. This is illustrated by the graphs in FIGS. 1 and 7. The recorder might also create a tape recording for later use.

The recorder might also be a computer means—a computer, a minicomputer, or a microcomputer—programmed to locate or relocate information within the computer information storage system appropriately and as would be required in response to the data received. This might be necessary in a large computer facility in which the data being received would be so extensive that it could not be understood and acted upon by the operator.

Figure 7:
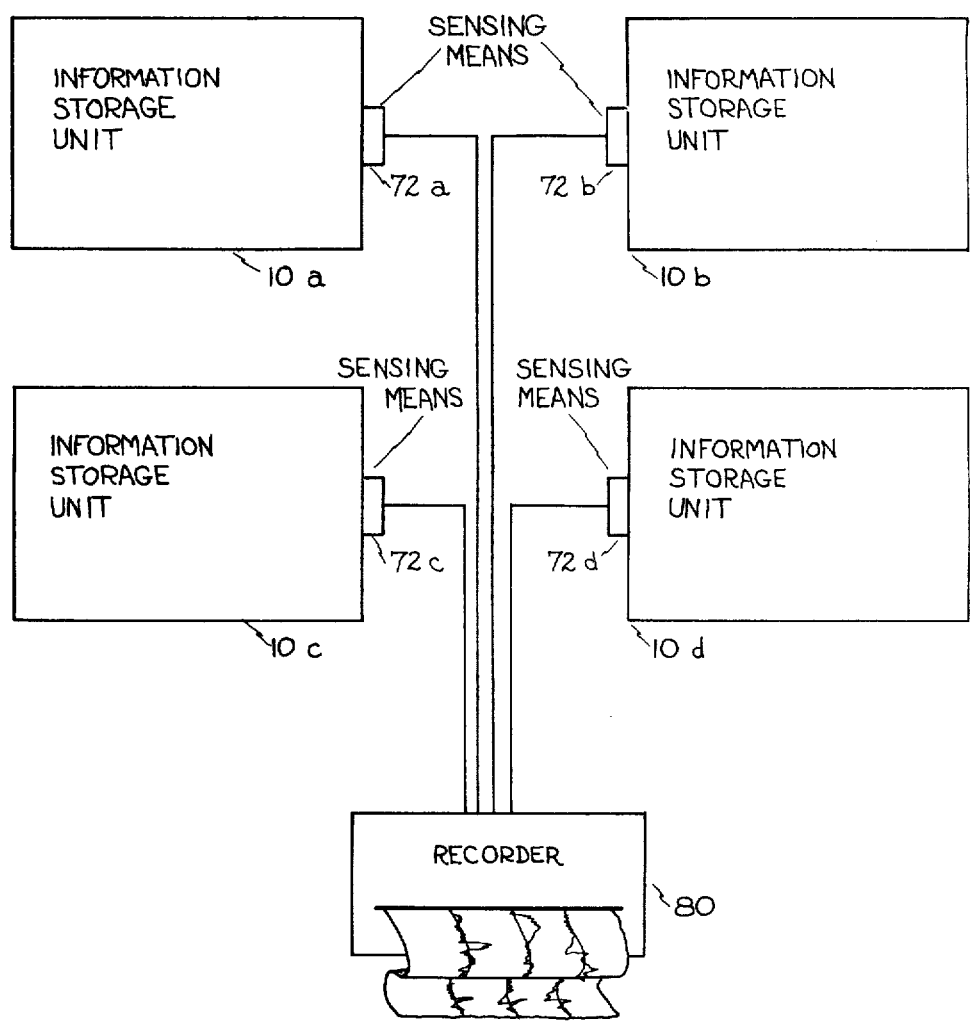
FIG. 7 is a block diagram of a typical multiple storage installation using the present system.

A portion of a multiple unit installation is shown in FIG. 7. In this Figure sensors 72a, 72b, 72c and 72d are attached to units 10a, 10b, 10c and 10d, respectively. The means 72a, 72b, 72c and 72d detect the flow and direction of current in the coil circuits of the units 10a, 10b, 10c and 10d. The data is carried to the central recorder 80 for processing and provision in an appropriate form.

I claim:

1. A device for obtaining data about the performance of a computer disc information storage device having a coil and armature for moving the read-write heads of said storage device comprising detector means for detecting externally of a coil circuit the flow and direction of current in said coil circuit, and current timing means connected to said detector means for determining from the output of said detector means the time current is flowing through said coil circuit.

2. The device of claim 1 further comprising recording means connected to said current timing means for indicating when said time is zero.

3. The device of claim 1 further comprising total time means for determining the total time in a given time interval, and percentage means connected to said current timing means and said total time means for determining from the output of said current timing means and said total time means the percentage of time current is flowing through said coil circuit during said given time interval.

4. The device of claim 3 further comprising
recorder means connected to said percentage means for providing data from said percentage means.

5. The device of claim 1 further comprising
cycle counting means connected to said detector means for determining from the output of said detector means a discrete cycle of current within said coil circuit, and
relative time means connected to said current timing means and said cycle counting means for determining from the output of said current timing means and said cycle counting means the relative time of a discrete cycle of current in said coil circuit.

6. The device of claim 5 further comprising
recorder means connected to said relative time means for providing data from said relative time means.

7. The device of claim 6 further comprising
upper threshold means connected to said recorder means for setting a predetermined upper relative time, and
said recorder means providing only relative times above said upper threshold relative time.

8. The device of claim 7 in which
said upper threshold means is in a circuit between said relative time means and said recorder means.

9. The device of claim 7 further comprising
means connected to said recorder means for maintaining said recorder means in an activated state for a predetermined length of time once it indicates a relative time greater than said threshold time.

10. The device of claim 6 further comprising
means connected to said recorder means for providing given data for a predetermined length of time.

11. A device for obtaining data about the performance of a computer disc information storage device having a coil and armature for moving the read-write heads of said storage device comprising
detector means for detecting externally of a coil circuit the flow and direction of current in said coil circuit, and
cycle counting means connected to said detector means for determining from the output of said detector means the discrete cycles of current within said coil circuit.

12. The device of claim 11 further comprising
recorder means connected to said cycle counting means for indicating when said cycle count is zero.

13. The device of claim 11 further comprising
head movement means connected to said cycle counting means for determining from the output of said cycle counting means the number of cycles of current in said coil circuit,
current timing means connected to said detector means for determining from the output of said detector means the time current is flowing through said coil circuit, and
average travel time means connected to said current timing means and said head movement means for determining from the output of said current timing means and said head movement means the average time of a current cycle in said coil circuit.

14. The device of claim 13 further comprising
recorder means connected with said average travel time means for providing data from said average travel time means.

15. The device of claim 11 further comprising
total time means for determining the total time in a given time interval, and
head movement means connected to said cycle counting means and said total time means for determining from the output of said cycle counting means and said total time means the number of cycles of current in said coil circuit in a given time interval.

16. The device of claim 15 further comprising
recorder means connected to said head movement means for providing data from said head movement means.

17. The device of claim 15 further comprising
current timing means connected to said detector means for determining from the output of said detector means the time current is flowing through said coil circuit, and
average travel time means connected to said current timing means and said head movement means for determining from the output of said current timing means and said head movement means the average time of a current cycle in said coil circuit.

18. The device of claim 17 further comprising
recorder means connected to said average travel time means for providing data from said average travel time means.

19. The device of claim 11 further comprising
current timing means connected to said detector means for determining from the output of said detector means the time current is flowing through said coil circuit, and
average travel time means connected to said current timing means and said cycle counting means for determining from the output of said current timing means and said cycle counting means the average time of a current cycle in said coil circuit.

20. The device of claim 19 further comprising
recorder means connected to said average travel time means for providing data from said average travel time means.

21. A method of obtaining data about the performance of a disc information storage device of a computer, said storage device having discs accessed by moveable read-write heads, comprising
detecting externally of a coil circuit used to move said read-write heads the flow and direction of current in said coil circuit, and
determining from said current flow the time said read-write heads are moving.

22. The method of claim 21 further comprising
determining from said time the percentage of time said read-write heads are moving during a given time interval.

23. The method of claim 21 further comprising
determining from said current direction a discrete movement of said read-write heads, and
determining from said movement of said read-write heads and said time of said movement of said read-write heads the relative time of a discrete movement of said read-write heads.

24. A method of obtaining data about the performance of a disc information storage device of a computer, said storage device having discs accessed by moveable read-write heads, comprising detecting externally of a coil circuit used to move said read-write heads the flow and direction of current in said coil circuit, and determining from said current direction the discrete moves of said read-write heads.

25. The method of claim 24 further comprising determining from said movements of said read-write heads the number of movements of said read-write heads during a given time interval.

26. The method of claim 25 further comprising determining from said current flow the time said read-write heads ae moving, and determining from the time said read-write heads are moving and the number of movements of said read-write heads in a given time interval.

27. The method of claim 24 further comprising determining from said current flow the time said read-write heads are moving, and determining from the time said read-write heads are moving and the number of movements of said read-write heads the average time of a movement of said read-write heads.

* * * * *